No. 846,085. PATENTED MAR. 5, 1907.
A. BODENSTEIN.
SPRING SEAT.
APPLICATION FILED MAR. 3, 1905.
Fig. 1.
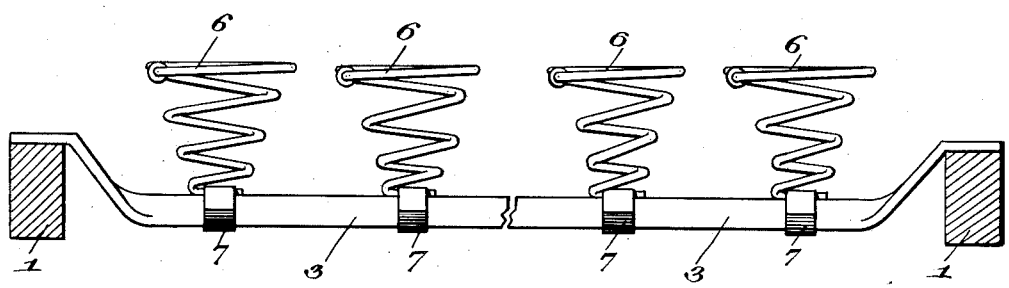
Fig. 2.
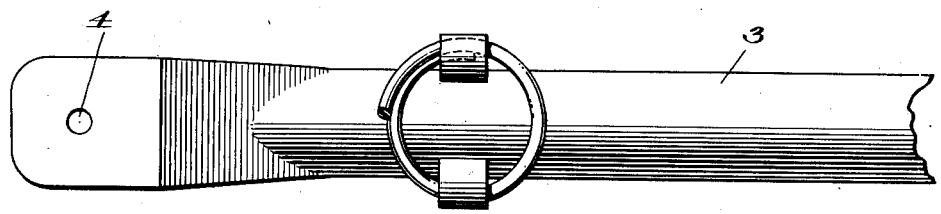
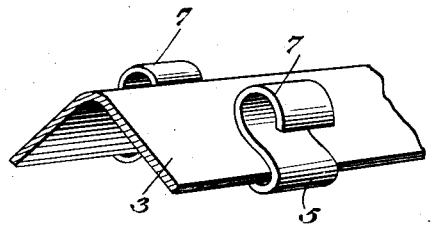
Fig. 3.
Fig. 4.
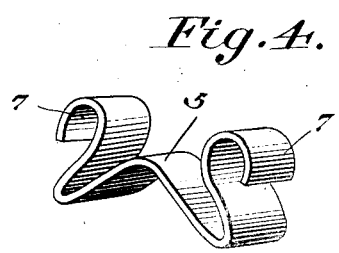
Witnesses: Inventor:

UNITED STATES PATENT OFFICE.

ALBERT BODENSTEIN, OF TRENTON, NEW JERSEY, ASSIGNOR TO THOMAS A. STOLL, OF TRENTON, NEW JERSEY.

SPRING-SEAT.

No. 846,085.　　　Specification of Letters Patent.　　　Patented March 5, 1907.

Application filed March 3, 1905. Serial No. 248,214.

*To all whom it may concern:*

Be it known that I, ALBERT BODENSTEIN, a citizen of the United States, residing at Trenton, in the county of Mercer and State of New Jersey, have invented certain new and useful Improvements in Spring-Seats, of which the following is a specification.

My invention relates to spring-seats for chairs, vehicles, &c., wherein the springs are seated upon and supported by cross-pieces which are in turn secured to the frame of the seats.

The object of my invention is to provide ready means of attaching the springs to said cross-pieces and securing them firmly thereto, producing thereby a simple and inexpensive construction.

In the accompanying drawing, forming a part of this specification, Figure 1 is a side view of my invention. Fig. 2 is a top view of a strut and a portion of a spring attached thereto by the novel means hereinafter described. Fig. 3 is a detail view of a portion of such strut with a clip thereto attached, and Fig. 4 is a perspective view of such clip.

Seats to which my said invention are applicable are usually provided with a rectangular frame of wood upon which the springs within such frame are indirectly supported. A cross-sectional view of two members of such a frame is shown at 1 and 2 in Fig. 1. On these members is supported the strut 3, which is made, preferably, of iron or steel and is attached to said members 1 and 2 by nails or screws entering said frame through apertures formed in the ends of said strut 3. The strut 3 is preferably formed, as shown in the drawing, with a lip at each end thereof, pierced as at 4. Throughout its principal length it is preferably corrugated, as shown in the drawings, for the purpose of affording sufficient rigidity of the strut with the least weight of metal.

5 is a clip made of metal of a sufficient strength and resiliency to be snapped upon the strut 3 and to retain its position thereon, as indicated in Fig. 3. The volute springs 6 have their lower ends screwed into the projecting hooks 7 of the clips 5, and by screwing the springs into said hooks sufficiently the clips 5 are contracted upon the strut 3 and the lower portion of said volute springs 6 sufficiently to gain and maintain a rigid attachment of said springs to said strut at any desired point where said clip or clips may be located on said strut, thereby maintaining said springs in a perpendicular position relative to said strut.

By my said construction I am enabled to provide a practical and satisfactory spring-seat and also to provide an article of manufacture both cheap and which may be readily assembled and adjusted to the satisfaction of the maker of the complete seat, who can at pleasure regulate or change the number of springs upon any one of the struts and can space the same at will.

Having thus described my invention, what I claim is—

The combination of a strut laterally and upwardly arched, a clip embracing said strut and having hooked ends rising slightly above the crown of said arch, and a spiral spring mounted on said arch of said strut, said spring having one or more of its lowermost coils engaged with said hooked ends of said clip and resting on the crown of said arch at a point on each side of said clip, and clamped between said arch and said hooked ends of said clip, substantially as described.

ALBERT BODENSTEIN.

Witnesses:
F. M. HILL,
WILLIAM R. PIPER.